US006714991B1

(12) United States Patent
Bak et al.

(10) Patent No.: US 6,714,991 B1
(45) Date of Patent: Mar. 30, 2004

(54) METHOD AND APPARATUS FOR IMPLEMENTING FAST SUBCLASS AND SUBTYPE CHECKS

(75) Inventors: Lars Bak, Palo Alto, CA (US); Srdjan Mitrovic, Redwood Shores, CA (US); Urs Hölzle, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/107,224

(22) Filed: Jun. 30, 1998

Related U.S. Application Data

(60) Provisional application No. 60/079,110, filed on Mar. 23, 1998.

(51) Int. Cl.[7] .................................................. G06F 9/00
(52) U.S. Cl. ........................................ 709/316; 717/108
(58) Field of Search ................................. 709/201–203, 709/310–316; 707/103; 717/114, 116, 131, 108

(56) References Cited

U.S. PATENT DOCUMENTS

| | | | | |
|---|---|---|---|---|
| 5,267,349 A | * | 11/1993 | Barabash et al. | 706/53 |
| 5,437,027 A | * | 7/1995 | Bannon et al. | 707/103 R |
| 5,579,518 A | * | 11/1996 | Yasumatsu | 717/131 |
| 5,793,963 A | * | 8/1998 | Tapperson et al. | 395/200 |
| 5,915,253 A | * | 6/1999 | Christiansen | 707/103 |

OTHER PUBLICATIONS

Oscar et al "Towards a Type Theory for Active Objects," pp. 1–10, IEEE–1990.*
Bruce "On the Unification of Substitutions in Type–Inference," pp. 1–23, IEEE–Mar. 1998.*
Pshuant@athena.mit.edu "Optimization Opportunities Unexploited: Examples Sought", Newsgroup message online Aug. 5, 1995, document XP002234506.
Dave Harrison scrop@btinternet.com, "Optimization Of Late Bindings In Java", Newsgroup message line Mar. 5, 1997, document XP00234507.
Steenkiste P et al., "Tags and Type Checking in LISP: Hardware and Software Approaches", Operating Systems Review (SIGOPS), ACM Headquarters, New York, vol. 21, No. 4, Oct. 1, 1987, document No. XP000001708.
Andrew Brault, ajb@ajb.res.wpi.edu, "A Strongly Typed Smalltalk?", Newsgroup message online, Apr. 28, 1996, document No. XP002234508.

* cited by examiner

Primary Examiner—John Follansbee
Assistant Examiner—Van H. Nguyen
(74) Attorney, Agent, or Firm—Beyer Weaver & Thomas LLP

(57) ABSTRACT

Methods and apparatus for performing fast subtype checks during program execution are disclosed. According to one aspect of the present invention, a method for determining whether a class associated with an object that is a part of an object-based computing system is a subtype of another type includes obtaining a candidate type from a dynamic storage location that is associated with a class which is associated with the object, and comparing the candidate type against a first type that is potentially the same as the candidate type. A determination is then made as to whether the candidate type is substantially equal to the first type. When the determination is that the candidate type is substantially equal to the first type, an indication that the candidate type is a subtype of the first type is provided. In one embodiment, the candidate type obtained from the dynamic storage location is obtained from a cache element in the class associated with the object.

30 Claims, 5 Drawing Sheets

METHOD AND APPARATUS FOR IMPLEMENTING FAST SUBCLASS AND SUBTYPE CHECKS

CROSS REFERENCE TO RELATED APPLICATION

The present invention claims priority of provisional U.S. patent application No. 60/079,110, filed Mar. 23, 1998 now abandoned, which is incorporated herein by reference in its entirety.

BACKGROUND OF THE INVENTION

1. Field of Invention

The present invention relates generally to determining relationships between objects in object-based systems. More particularly, the present invention relates to efficiently performing subtype checks on objects in object-based systems.

2. Description of the Relevant Art

Many object-based computing systems are structured such that objects are members of specific classes and sub-classes which define the functionality that is available to the objects. During program execution, a virtual machine typically checks relationships between objects in order to facilitate the execution of the program. By way of example, a virtual machine may check sub-class, or subtype, relationships between objects. In some programming languages, e.g., the Java™ programming language developed by Sun Microsystems, Inc. of Palo Alto, California, constructs within the programming languages involve sub-class checks. Such sub-class checks generally involve determinations of whether a particular object is of a given type. That is, the class structures associated with the program are checked to determine the type of the particular object.

FIG. 1 is a diagrammatic representation of a conventional class structure. A class structure 102, i.e., a class hierarchy, includes a class 106 and sub-classes 110. In general, class 106 is an abstract class that may include any number of sub-classes 110. As shown, sub-class "1" 110a, sub-class "2" 110b, and sub-class "N" 110c are "direct" sub-classes of class 106, while sub-class "A1" 110d is a direct sub-class of sub-class "1" 110a. Sub-class "A1" 110d may be considered to be an indirect sub-class of class 106 since sub-class "A1" 110d is a sub-class of sub-class "1" 110a, which is a sub-class of class 106.

Class 106 typically includes a variety of different functions, or methods. Each sub-class 110 generally contains a different set of functions. By way of example, sub-class "1" 110a will generally include functions that are specific to objects which are a part of sub-class "1" 110a. An object that is a member of class 106 may perform substantially all functions associated with class 106. Any object that is a member of any of sub-classes 110 is also a member of class 106. As such, an object that is a member of any of sub-classes 110 may also perform the functions associated with class 106. However, an object that is a member of a particular sub-class, e.g., sub-class "1" 110a, may not perform the specific functions associated with a different sub-class, e.g., sub-class "2" 110b. Therefore, a determination of which sub-class 110 an object belongs to effectively determines the functions that the object may perform.

A narrowing cast may be used at runtime to effectively view an object defined by class 106 as an object defined by sub-class "1" 110a. However, since the object defined by class 106 may be defined by sub-class "2" 110b, rather than by sub-class "1" 110a, a check is typically made to determine whether associated the object with sub-class "1" 110a is accurate. As will be appreciated by those skilled in the art, a check regarding whether an object is associated with sub-class "1" 110a is effectively a check to determine whether the object is associated with at least sub-class "1" 110a. In other words, an object that is associated with sub-class "A1" 110d will generally be determined to be associated with sub-class "1" 110a as well.

In a Java™ environment, a function which determines the subtype of an object, e.g., an is_subtype function, may be statically encoded. While methods used to statically encode the function may vary, one method that is commonly used involves the use of a two-dimensional bit matrix where a bit at a location defined by (i,j) encodes the result of is_subtype (ti,tj). Using such a matrix, a subtype check effectively involves indexing into the matrix to determine the subtype of an object. However, the size of the matrix may be substantial, and the subtype checks are often slow due to the bit manipulation of instructions that is typically required.

In general, when sub-type checks are made, substantially all sub-types of a type, e.g., substantially all sub-classes of a class, must typically be checked to determine the sub-type of a particular object. In some hierarchical class structures, e.g., class structure 102 of FIG. 1, the number of sub-classes which must be checked may be relatively high. By way of example, some classes may have hundreds of associated sub-classes. As such, the implementation of subtype checks often proves to be inefficient when multiple subtypes are available, as is the case with interfaces defined in the Java™ programming language. That is, when multiple subtypes are available, the checking of each subtype is typically time-consuming, as mentioned above. In addition, implementing subtype checks in a system which uses multiple inheritance layers, e.g., systems defined in the C++ programming language, is also often inefficient. For a system with multiple inheritance layers, subtype checks are generally difficult to implement efficiently due to the fact that each layer of inheritance must be checked.

The implementation of efficient subtype checks is important since the checks may occur frequently. When the checks occur frequently during the execution of a program the overhead associated with the checks may be relatively high. In some cases, a run-time subtype check, or test, may require on the order of approximately eight instructions which, as will be appreciated by those skilled in the art, may be significant with respect to the overall program, especially if repeated run-time subtype checks are made. Hence, the speed at which the program executes may be compromised by the frequent subtype checks.

Typically, when subtypes are checked during the execution of a program, substantially all classes and methods associated with the program must be known. Data structures are often constructed to list all classes and methods associated with a program, so that the classes and methods are readily accessible. In other words, data structures used in subtype checks must often be computed before program execution. Such data structures are often relatively large, and consume significant system resources. Further, the requirement that all classes and methods associated with a program are known is not compatible with systems which utilize dynamic linking, or dynamic class loading, as dynamic linking allows the classes and methods associated with the program to effectively change. The functionality of a program may be compromised by the inability to utilize dynamic linking. In an environment which uses dynamic linking, the data structures are generally recomputed after every operation which involves class loading, which is time-consuming and, hence, inefficient.

Therefore, what is desired is a method and an apparatus for improving the efficiency with which subtype checks may occur. More particularly, what is desired is a method and an apparatus for efficiently performing subtype checks without requiring that data structures be recomputed each time a class loading operation occurs.

SUMMARY OF THE INVENTION

Methods and apparatus for performing fast subtype checks during program execution are disclosed. According to one aspect of the present invention, a method for quickly and efficiently determining a type associated with an object that is a part of an object-based computing system includes obtaining a candidate type from a dynamic storage location that is associated with a class which is associated with the object, and comparing the candidate type against a first type that is potentially the same as the candidate type. A determination is then made as to whether the candidate type is substantially equal to the first type. When the determination is that the candidate type is substantially equal to the first type, an indication that the candidate type is substantially equal to the first type is provided.

In one embodiment, the candidate type obtained from the class associated with the object is obtained from a cache element in the class associated with the object. In such an embodiment, comparing the candidate type against the first type may include loading the candidate type from the cache element into a register, and comparing the contents of cache element to the first type.

According to another aspect of the present invention, a computer system is arranged to determine a type associated with a first object that is resident on the computer system. The computer system includes a processor, memory, and a loading mechanism arranged to load a candidate type into memory. The candid ate type is obtained from a class object that is associated with the first object. The computer system also includes a comparison mechanism arranged to compare the candidate type against a first type, and a determination mechanism arranged to determine whether the candidate type is substantially equal to the first type. An indicator in the computer system is arranged to provide an indication that the candidate type is substantially equal to the first type when it is determined that the candidate type is substantially equal to the first type.

In one embodiment, the computer system also includes a computing mechanism that is arranged to compute a type relationship between the class object and the first type when it is determined that the candidate type is not substantially equal to the first type. In such an embodiment, a determining mechanism may be used to determine whether a type relationship exists between the class object and the first type, and a storage mechanism may be arranged to store an indication of the first type into the cache element of the class object when it is determined that a type relationship exists between the class object and the first type.

According to still another aspect of the present invention, a method for performing a subtype check on an object that is a member of a particular class includes obtaining a stored element from a location associated with the particular class. The stored element includes information relating to a first subtype that is potentially associated with the object. The method also includes determining whether the information included in the stored element is related to an actual subtype that is associated with the object, and providing an indication that the information included in the stored element is related to the actual subtype when the stored element and the actual subtype are related. In one embodiment, the method also involves determining the actual subtype of the object when the information included in the stored element is not related to the actual subtype, as well as storing information relating to the actual subtype into the location associated with the particular class. The present invention will be better understood upon reading the following detailed descriptions and studying the various figures of the drawings.

BRIEF DESCRIPTION OF THE DRAWINGS

The present invention, in specific embodiments, may be understood by reference to the following description taken in conjunction with the accompanying drawings in which.

DETAILED DESCRIPTION OF SPECIFIC EMBODIMENTS

In general, subtype checks performed to determine a subtype relationship between objects require a considerable amount of computer memory space. The space is required for the instructions associated with performing subtype checks, as well as for pre-computed data structures which are often used to store all types and methods associated with the execution of a computer program. The space required for subtype checks, in addition to the overhead required to perform repeated subtype checks, often compromise the speed at which a program executes.

By saving expected results of subtype checks, the amount of overhead associated with performing subtype checks may effectively be reduced. Specifically, at run-time, the first time a subtype associated with an object is to be checked against a particular type, the actual check may be made using substantially any method, as will be appreciated by those skilled in the art. Since subsequent checks on an object of the same class are likely to have the same subtype result, saving the result of the actual check, e.g., the computational result of the first check, may enable the overhead associated with performing subtype checks to be significantly reduced. In other words, a dynamic subtype checking mechanism which utilizes caching allows results of previous subtype checks to be cached to speed up the same checks when the same checks are subsequently performed by allowing the cached values to be used if the cached values are determined to be correct, i.e., appropriate. In one embodiment, the cached data may be held in a type descriptor of the value, e.g., object, that is being tested or checked.

After an initial check to determine the subtype of an object "s," which is associated with a class, is performed, the results of the initial check are stored. By storing the results of the initial subtype check, the next time a check to determine the subtype of object "s" is required, the stored results allow the same subtype check to proceed more quickly. By way of example, when the subtype of object "s" is to be checked against a type "T," i.e., when a determination is to be made regarding whether object "s" is of a particular subtype "T," a relatively fast comparison may be made between the stored type descriptor associated with object "s" and subtype "T." When the type of object "s" is equal to subtype "T," then the comparison is considered to be successful, and a conventional subtype check is generally not required. Hence, the overhead associated with a conventional subtype check may be avoided. Alternatively, if the type of object "s" is not equal to subtype "T," then a conventional subtype check may be used to determine the type of object "s." In some cases, such a check may involve traversing a class hierarchy to locate the appropriate subtype, and raising an exception when an appropriate subtype cannot be found.

Figure 1:
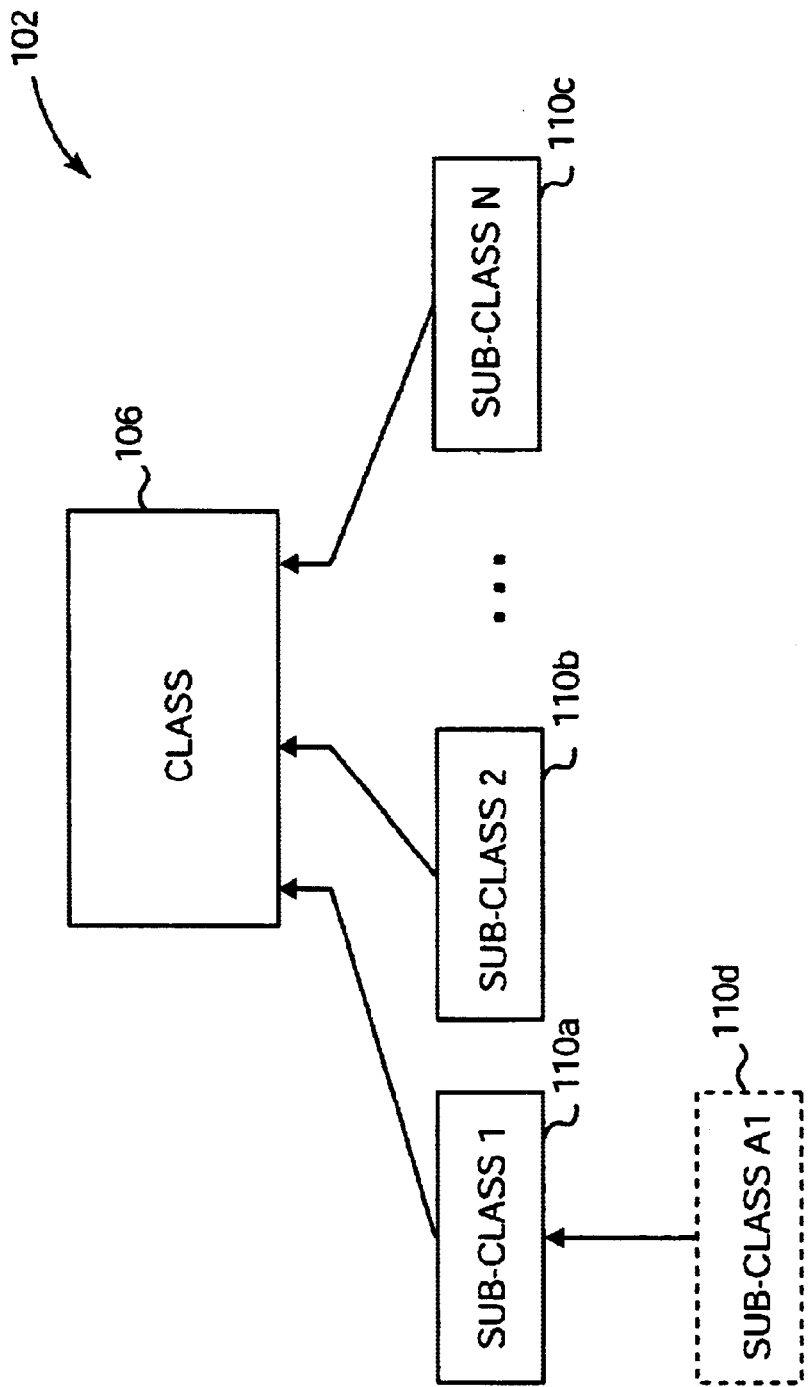
FIG. 1 is a diagrammatic representation of a conventional class hierarchy.
Figure 2A:
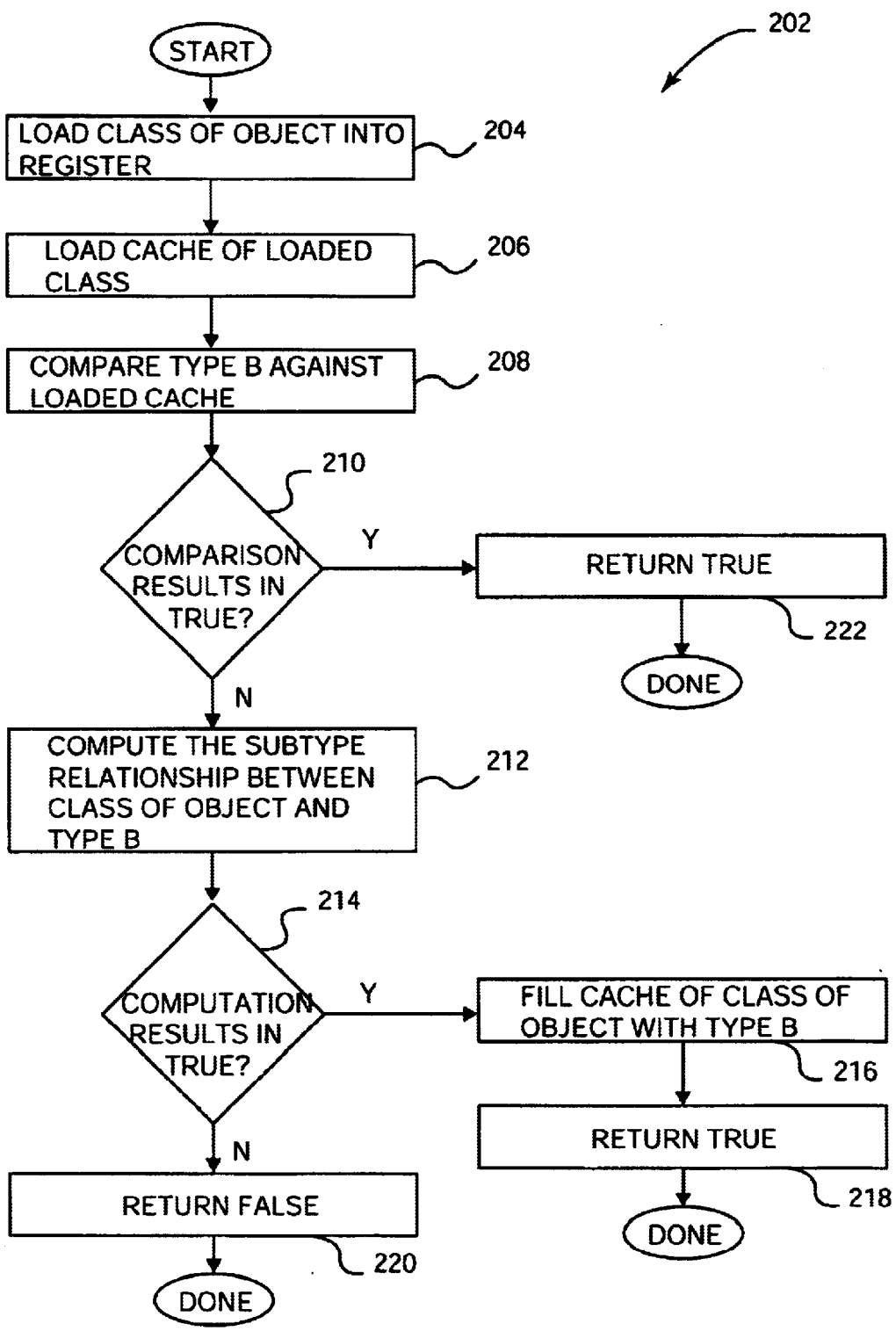
FIG. 2a is a process flow diagram which illustrates the steps associated with determining if an object is a subtype of a particular type in accordance with an embodiment of the present invention.

With reference to FIG. 2a, the steps associated with determining whether an object is a subtype, or sub-class, of a particular type will be described in accordance with an embodiment of the present invention. Specifically, a process of determining whether an object is a subtype of a type "B" will be described. A process 202 of determining whether an object is a subtype of type B begins at step 204 in which the type, e.g., class, of the object is loaded into a register associated with a computer system. As will be appreciated by those skilled in the art, the overall class, e.g., an abstract class, of the object is known. Once the class of the object is loaded into the register, then in step 206, the cache element of the loaded class is loaded, e.g., loaded into computer memory. The cache element, or cache, will be described below with reference to FIG. 2c.

After the cache is loaded, type B is compared against the loaded cache in step 208. The steps associated with comparing type B with the loaded cache will be discussed below with respect to FIG. 2b. A determination is made in step 210 regarding the results of the comparison of type B against the loaded cache. In the described embodiment, if the comparison of type B with the loaded cache results in a true result, i.e., if the comparison determines that type B and the loaded cache are a match, then a true value is returned in step 222 to the function that requested that the determination of whether the object is a subtype of type B. In other words, a true value is returned if the loaded class and type B are the same class, or if the loaded class is a subtype of type B. Once the value of true is returned, the process of determining whether an object is a subtype of type B is completed.

Alternatively, if the determination in step 210 is that the comparison of type B against the loaded cache does not provide a true result, then the subtype relationship between the class of the object and type B is computed in step 212. That is, when it is determined that the class of the object and type B are not the same, then a computation is made to determine the relationship, if any, between the class of the object and type B. After the subtype relationship is computed, process flow proceeds to step 214 in which a determination is made as to whether the computation of a subtype gives rise to a true result, i.e., whether there is a valid subtype relationship between the class of the object and type B.

If the determination in step 214 is that there is no subtype relationship between the class of the object and types B, then in step 220, a value of false is returned to the function that requested the subtype check. Once the value of false is returned, the process of determining whether an object is a subtype of type B is completed. However, if the determination in step 214 is that there is a subtype relationship between the class of the object and type B, then process flow moves to step 216 in which the cache of the class of the object is "filled" with class B. In other words, class B, or a reference to type B, is stored into the cache element of the class of the object. Finally, after the cache of the class of the object is filled with type B, a value of true is returned to the system in step 218 to indicate that there is a subtype relationship between the class of the object and type B. Then, the process of determining whether an object is a subtype of type B is completed.

Figure 2B:
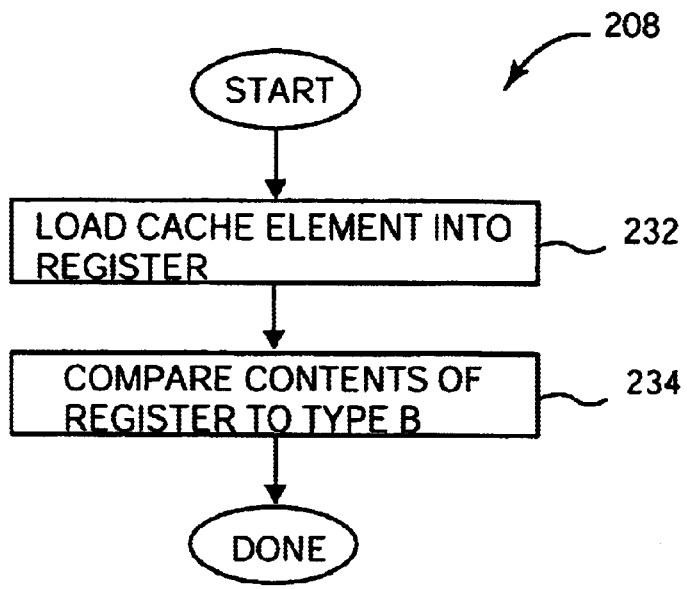
FIG. 2b is a process flow diagram which illustrates the steps associated with comparing a type against a loaded cache, i.e., step 208 of FIG. 2a, in accordance with an embodiment of the present invention.

Referring next to FIG. 2b, the steps associated with comparing type B against a loaded cache, e.g., a class of a particular object, will be described in accordance with an embodiment of the present invention. That is, one embodiment of step 208 of FIG. 2a will be discussed. A comparison of type B against the loaded cache begins at step 232 where the cache element is loaded into a register. Specifically, the cache element, which will be described below with reference to FIG. 2c, of the class of the object is loaded into a register. After the cache element is loaded into the register, the contents of the register are compared to type B in step 234. As discussed above, a checking mechanism which utilizes caching allows results of previous subtype checks to be cached to speed up the same checks when the same checks are subsequently performed by allowing the cached values to be used. By having a cached element to use in a check, the element is readily accessible. Substantially any suitable method may be used to compare the cache element with the contents of the register. Such methods are generally well-known to those skilled in the art. Once the contents of the register are compared to type B, the process of comparing type B against the loaded cache is completed.

Figure 2C:
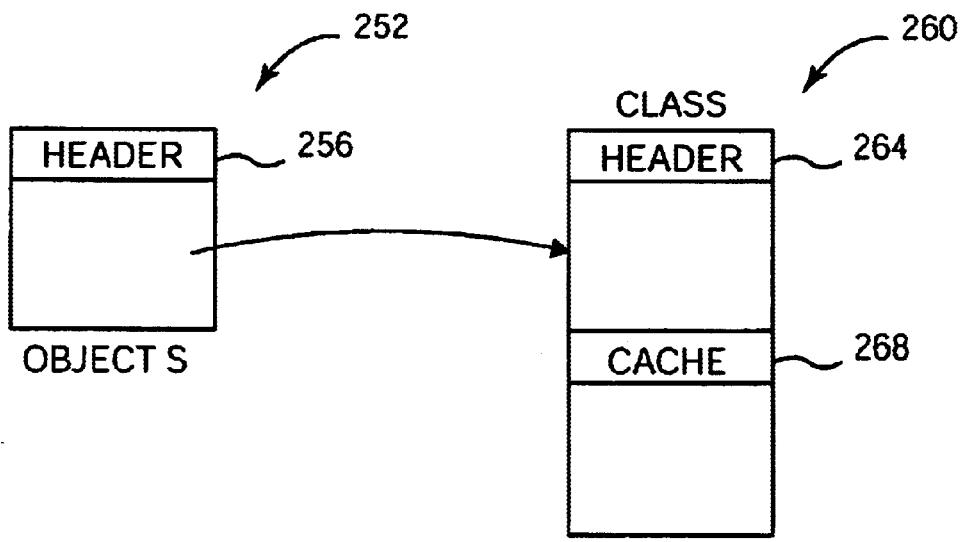
FIG. 2c is a diagrammatic representation of a class with a cache element in accordance with an embodiment of the present invention.

As previously discussed, a class, e.g., a class object, includes a cache element in which the result of a previous subtype check may be stored. FIG. 2c is a diagrammatic representation of a class with a cache element in accordance with an embodiment of the present invention. An object "S" 252 includes a header 256, and has a class pointer to a class 260. Class 260 includes a header 264 and a cache element 268. Cache element 268 is, as previously mentioned, arranged to store the result of a previous, e.g., first, subtype check associated with class 260. It should be appreciated that when class 260 is initialized, cache element 268 may generally be initialized to any value. By way of example, cache element 268 may be initialized to identify class 260. In general, cache element 268 may be considered to be a "dynamic" storage element, as the result stored in cache element 268 may change as a program executes or, more specifically, as subtype checks are performed. That is, the contents of cache element 268 may be updated.

When object "s" 252 is known to be a member of class 260, during a subtype check involving object "s" 252, cache element 268 may be accessed to obtain the results of the most recent subtype check involving class 260. In general, cache element 268 may be updated to store the results of the most recent subtype check involving class 260. As such, in the event that the result stored in cache element 268 is not the subtype associated with object "s" 252, then the actual subtype associated with object "s" 252, once determined, may be stored into cache element 268. It should be appreciated that in some embodiments, storing and, also, retrieving information from cache element 268 may involve synchronization to address cache coherency issues which may arise.

Figure 3:
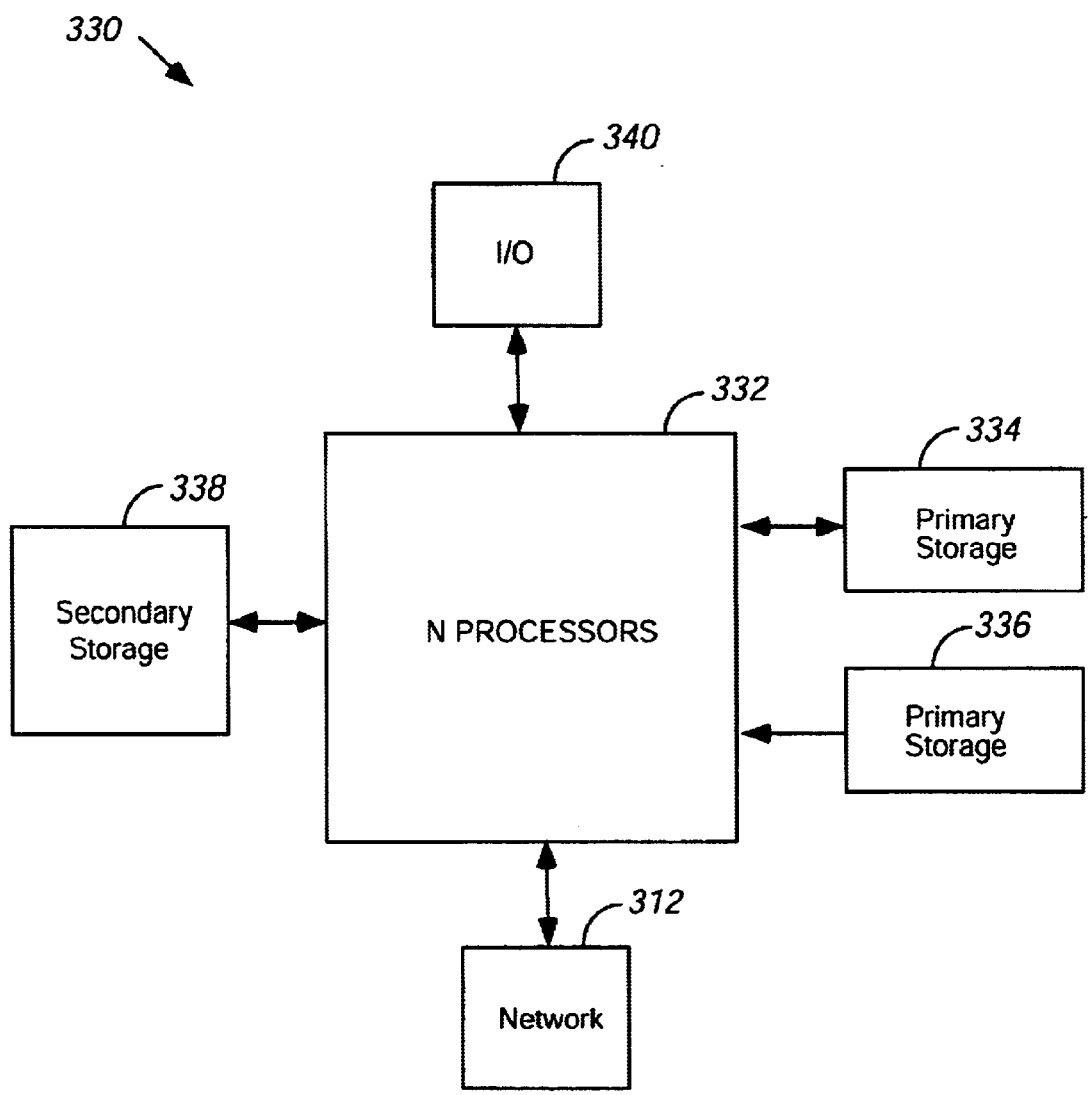
FIG. 3 is a diagrammatic representation of a computer system suitable for implementing the present invention.

FIG. 3 illustrates a typical, general-purpose computer system suitable for implementing the present invention. A computer system 330 includes any number of processors 332, also referred to as central processing units (CPUs), that are coupled to memory devices. The memory devices generally include primary storage devices 334, such as a random access memory (RAM)), and primary storage devices 336, such as a read only memory (ROM), Computer system 330 or, more specifically, CPUs 332, may be arranged to support a virtual machine, as will be appreciated by those skilled in the art. One example of a virtual machine that is supported on computer system 330 will be described below with reference to FIG. 4. As is well known in the art, ROM 334 acts to transfer data and instructions uni-directionally to CPUs 332, while RAM 336 is used typically to transfer data and instructions to and from CPUs 332 in a bi-directional manner. Both primary storage devices 334, 336 may include substantially any suitable computer-readable media. A secondary storage medium 338, which is typically a mass memory device, may also be coupled bi-directionally to CPUs 332. In general, secondary storage medium 338 is arranged to provide additional data storage capacity, and may be a computer-readable medium that is used to store programs including computer code, computer program code devices, data, and the like. Typically, secondary storage medium 338 is a storage medium such as a hard disk or a tape which may be slower than primary storage devices 334, 336. Secondary storage medium 338 may take the form of a well-known device including, but not limited to, magnetic and paper tape readers. As will be appreciated by those skilled in the art, the information retained within secondary storage medium 338, may, in appropriate cases, be incorporated in a standard fashion as part of RAM 336, e.g., as virtual memory. A specific primary storage device 334 such as a CD-ROM may also pass data uni-directionally to the CPUs 332.

CPUs 332 are also coupled to one or more input/output devices 340 that may include, but are not limited to, video monitors, track balls, mice, keyboards, microphones, touch-sensitive displays, transducer card readers, magnetic or paper tape readers, tablets, styluses, voice or handwriting recognizers, as well as other well-known input devices, such as other computers. Finally, CPUs 332 optionally may be coupled to a computer or a telecommunications network, e.g., an internet network or an intranet network, using a network connection as shown generally at 312. With such a network connection 312, it is contemplated that the CPUs 332 may receive information from a network. CPUs 332 may also output information to the network in the course of performing the above-described method steps. Such information, which is often represented as a sequence of instructions to be executed using CPUs 332, may be received from and outputted to the network, for example, in the form of a computer data signal embodied in a carrier wave. The above-described devices and materials will be familiar to those of skill in the computer hardware and software arts.

Figure 4:
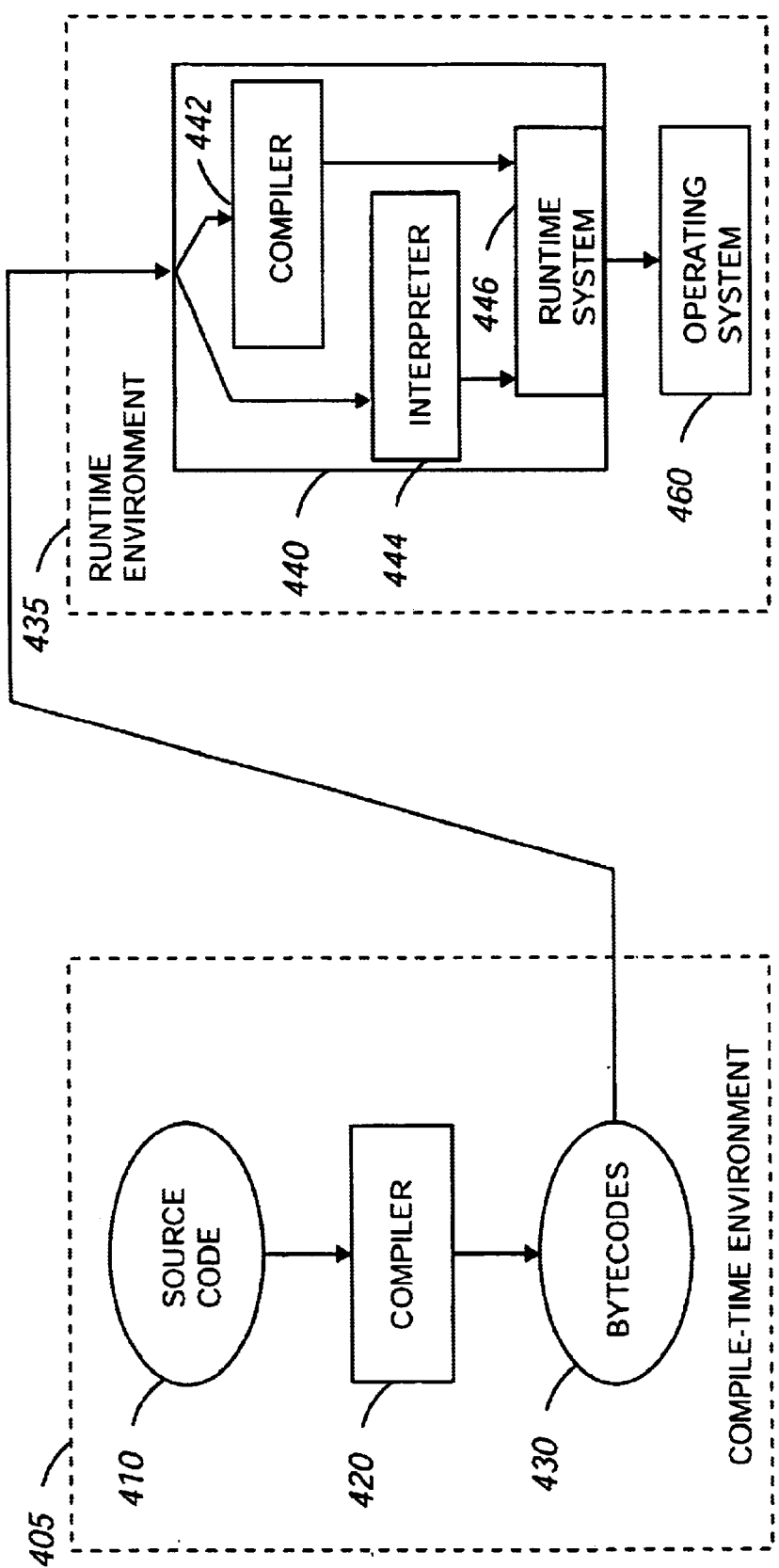
FIG. 4 is a diagrammatic representation of a virtual machine in accordance with an embodiment of the present invention.

As previously mentioned, a virtual machine may execute on computer system 330. FIG. 4 is a diagrammatic representation of a virtual machine which is supported by computer system 330 of FIG. 3, and is suitable for implementing the present invention. When a computer program, e.g., a computer program written in the Java™ programming language, is executed, source code 410 is provided to a compiler 420 within compile-time environment 405. Compiler 420 translates source code 410 into bytecodes 430. In general, source code 410 is translated into bytecodes 430 at the time source code 410 is created by a software developer.

Bytecodes 430 may generally be reproduced, downloaded, or otherwise distributed through a network, e.g., network 312 of FIG. 3, or stored on a storage device such as primary storage 334 of FIG. 3. In the described embodiment, bytecodes 430 are platform independent. That is, bytecodes 430 may be executed on substantially any computer system that is running on a suitable virtual machine 440.

Bytecodes 430 are provided to a runtime environment 435 which includes virtual machine 440. In one embodiment, the virtual machine may be a Java™ virtual machine. Runtime environment 435 may generally be executed using a processor or processors such as CPUs 332 of FIG. 3. Virtual machine 440 includes a compiler 442, an interpreter 444, and a runtime system 446. Bytecodes 430 may be provided either to compiler 442 or interpreter 444.

When bytecodes 430 are provided to compiler 442, methods contained in bytecodes 430 are compiled into machine instructions. In one embodiment, compiler 442 is a just-in-time compiler which delays the compilation of methods contained in bytecodes 430 until the methods are about to be executed. When bytecodes 430 are provided to interpreter 444, bytecodes 430 are read into interpreter 444 one bytecode at a time. Interpreter 444 then performs the operation defined by each bytecode as each bytecode is read into interpreter 444. That is, interpreter 444 "interprets" bytecodes 430, as will be appreciated by those skilled in the art. In general, interpreter 444 processes bytecodes 430 and performs operations associated with bytecodes 430 substantially continuously.

When a method is invoked by another method, or is invoked from runtime environment 435, if the method is interpreted, runtime system 446 may obtain the method from runtime environment 435 in the form of a sequence of bytecodes 430, which may be directly executed by interpreter 444. If, on the other hand, the method which is invoked is a compiled method which has not been compiled, runtime system 446 also obtains the method from runtime environment 435 in the form of a sequence of bytecodes 430, then may go on to activate compiler 442. Compiler 442 then generates machine instructions from bytecodes 430, and the resulting machine-language instructions may be executed directly by CPUs 332 of FIG. 3. In general, the machine-language instructions are discarded when virtual machine 440 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, in some embodiments, a class object may include more than one cache element. When a class object includes more than one cache element, then more than one previous result of a subtype check may be stored. That is, more than one likely subtype for an object may be stored such that if it is determined that the subtype stored in one cache element is not the subtype for the object, then the subtype stored in another cache element may be checked.

While the present invention has been described in terms of storing a previous result of a subtype check in a cache element of a class, it should be appreciated that the previous results may not necessarily be stored in the cache element.

Instead, the previous results may be stored in substantially any dynamic storage location that is accessible during a subtype check. By way of example, the results of a previous subtype check may be stored in a section of computer code that is not directly associated with the class. Alternatively, the results of a previous subtype check may be stored in a dynamic, globally accessible table that is accessed each time a subtype check involving a particular class is performed. Such a table may be directly associated with the particular class.

It should be appreciated that in one embodiment, in lieu of implementing a check to determine whether a particular object is of a certain subtype, a check may be implemented to determine whether a particular object is not of a certain subtype. The results of such a check may generally be stored in a cache element of a class, in a segment of computer code, or as part of a global table. In other words, a cache element may be arranged to hold a subtype designation that is likely not to be a match for a specific subtype check.

In general, the instructions, or operations, which use subtype checks may be widely varied depending upon the requirements of a particular system. Within a Java™ environment, for instance, an "aastore" instruction, a "checkcast" instruction, and an "instanceof" instruction generally utilize subtype checks. Such instructions are described in *The Java™ Virtual Machine Specification*, which is incorporated by reference.

Further, the steps associated with performing a subtype check in accordance with the present invention may vary. Steps may generally be altered, reordered, added, and removed without departing from the spirit or the scope of the present invention. By way of example, determinations of whether comparisons and computations result in "true" designations may instead be determinations of whether comparisons and computations result in "false" designations. Alternatively, when a class object includes more than one cache element, then the steps associated with performing a subtype check may include steps which effectively loop through each cache element until either a subtype match is found, or all cache elements have been tested. Therefore, the present examples are to be considered as illustrative and not restrictive, and the invention is not to be limited to the details given herein, but is defined by the appended claims and their full scope of equivalents.

The claimed invention is:

1. A computer-implemented method for determining whether a class associated with an object that is a part of an object-based computing system is a subtype of another type, the method comprising:

obtaining a candidate type, from a dynamic storage location accessible when the class of the object is accessed, wherein the dynamic storage location is operable to include subtype check results;

comparing the candidate type against a fist type;

determining whether the candidate type is substantially equal to the first type; and providing an indication that the candidate type is a subtype of the first type when it is determined that the candidate type is substantially equal to the first type.

2. A computer-implemented method as recited in claim 1 wherein the candidate type obtained from the dynamic storage location associated with the class associated with the object is obtained from a cache element in the class associated with the object.

3. A computer-implemented method as recited in claim 2 wherein comparing the candidate type against the first type includes:

loading the candidate type from the cache element into a register; and comparing the contents of cache element to the first type.

4. A computer-implemented method as recited in claim 1 wherein when it is determined that the candidate type is not subtantially equal to the first type, the method further includes:

computing a type relationship between the class of the object and the first type.

5. A computer-implemented method as recited in claim 4 further including determining whether a type relationship exists between the class of the object and the first type, wherein when it is determined that a type relationship exists between the class of the object and the first type, an indication of the first type is stored in the cache element of the class of the object.

6. A computer-implemented method as recited in claim 1 further including loading the class of the object into a register.

7. A computer system arranged to determine a subtype associated with a first object that is resident on the computer system, the computer system including:

a processor;

a loading mechanism arranged to load a candidate type into memory associated with the computer system, the candidate type being obtained from a dynamic storage location accessible when the class of the object is accessed, wherein the dynamic storage location is operable to include subtype check results;

a comparison mechanism arranged to compare the candidate type against a first type;

a determination mechanism arranged to determine whether the candidate type is substantially equal to the first type; and an indicator arranged to provide an indication that the candidate type is a subtype of the first type when it is determined that the candidate type is substantially equal to the first type.

8. A computer system according to claim 7 wherein the candidate type obtained from the class object is obtained from a cache element in the class object.

9. A computer system according to claim 8 wherein the comparison mechanism arranged to compare the candidate type against the first type includes:

a loading mechanism arranged to load the candidate type from the cache element into a register; and a comparison mechanism arranged to compare the contents of cache element to the first type.

10. A computer system according to claim 7 further including a computing mechanism arranged to compute a type relationship between the class object and the first type when it is determined that the candidate type is not substantially equal to the first type.

11. A computer system according to claim 10 further including:

a determining mechanism arranged to determine whether a type relationship exists between the class object and the first type; and a storage mechanism arranged to store an indication of the first type into the cache element of the class object when it is determined that a type relationship exists between the class object and the fist type.

12. A computer program product arranged to cause a computer to determine a subtype associated with a first object that is a part of an object-based computing system, the computer program product comprising:

computer code that obtains a candidate type from a class object in a dynamic storage location associated with the first object, wherein the class object contains previous subtype check results;

computer code that compares the candidate type against a first type;

computer code that determines whether the candidate type is substantially equal to the first type;

computer code that provides an indication that the candidate type is a subtype of the first type when it is determined that the candidate type is substantially equal to the first type; and a computer readable medium that stores the computer codes.

13. A computer program product as recited in claim 12 wherein the computer code that obtains the candidate type obtained from the class object includes computer code that obtains the candidate type from a cache element in the class object.

14. A computer program product as recited in claim 13 wherein the computer code that compares the candidate type against the first type includes: computer code that loads the candidate type from the cache element into a register; and computer code that compares the contents of cache element to the first type.

15. A computer program product as recited in claim 12 further including computer code that computes a type relationship between the class object and the first type when it is determined that the candidate type is not substantially equal to the first type.

16. A computer program product as recited in claim 15 further including:

computer code that determines whether a type relationship exists between the class of the object and the first type; and computer code that stores an indication of the first type in the cache element of the class object when it is determined that a type relationship exists between the class object and the first type.

17. A computer program product as recited in claim 12 further including computer code that loads the class object into a register.

18. A computer program product as recited in claim 12 wherein the computer readable medium is a data signal embodied in a carrier wave.

19. A computer-implemented method for performing a subtype check on an object that is a member of a particular class, the method comprising:

obtaining a stored element from a dynamic storage location associated with the particular class, the stored element including information relating to a first subtype tat is potentially associated with the object, wherein the stored element is obtained without referencing data structure external to the class;

determining whether the information included in the stored element is related to an actual subtype that is associated with the object; and providing an indication that the information included in the stored element is related to the actual subtype when it is determined that the information included in the stored element is related to the actual subtype.

20. A computer-implemented method as recited in claim 19 wherein including:

determining the actual subtype that is associated with the object when it is determined that the information included in the stored element is not related to the actual subtype; and storing information relating to the actual subtype in the location associated with the particular class.

21. A computer-implemented method for determine whether a class associated with an object that is a part of an object-based computing system is a subtype of another type, the object being of a first type, the method comprising:

obtaining a second type from a data structure containing multiple types, the second type being a candidate type for the object;

comparing the first type against the second type;

determining whether the second type is substantially equal to the first type; and storing information associated with the second type it a dynamic storage location associated with the class associated with the object when it is determined that the second type is substantially equal to the first type, wherein storing the information in the dynamic storage location allows the information to be accessed for a subsequent type check without accessing the data structure containing multiple types.

22. A computer-implemented method as recited in claim 21 further including: providing an indication that the second type is a subtype of the first type when it is determined that he second type is substantially equal to the first type.

23. A computer-implemented method as recited in claim 21 wherein obtaining the second type includes obtaining the second type from the data structure containing multiple types.

24. A computer-implemented method as recited in claim 23 further including creating the data structure containing multiple types.

25. A computer-implemented method as recited in claim 21 further including:

obtaining a third type when it is determined that the second type is not substantially equal to the first type, the third type being a candidate type for the object, wherein the third type is obtained from the data structure containing multiple types;

comparing the first type against the third type;

determining whether the third type is substantially equal to the fist type; and storing information associated with the third type in the dynamic storage location when it is determine that the third type is substantially equal to the first type.

26. A computer-implemented method for determining whether a class associated with an object that is a part of an object-based computing system is a subtype of another type, the method comprising:

storing a fist candidate type in a dynamic storage location associated with the class associated with the object;

obtaining the first candidate type from be dynamic storage location, wherein the dynamic storage location is operable to include subtype check results;

comparing the first candidate type against an object type, the object type being associated with the object;

determining whether the first candidate type and the object type are substantially the same; and providing an indication that the first candidate type is a subtype of the object type when it is determined that the first candidate type and the object type are substantially the same.

27. A computer-implemented method as recited in claim 26 wherein when it is determined that the first candidate type and the object type are not substantially the same, the method further includes:

obtaining a second candidate type, wherein the second candidate type is not obtained from the dynamic storage location;

comparing the second candidate type against the object type;

determining whether the second candidate type and the object type are substantially the same;

providing an indication that the second candidate type is a subtype of the object type when it is determined that the second candidate type and the object type are substantially the same; and storing the second candidate type in the dynamic storage location.

28. A computer system arranged to determine a subtype associated with an object of a first type that is resident on the computer system, the computer system including:

a processor;

a first mechanism arranged to obtain a second type from a data structure containing multiple types, the second type being a candidate type for the object;

a comparator for comparing the first type against the second type;

a determination mechanism for determining whether the second type is substantially equal to the first type; and a dynamic storage mechanism for storing information associated with the second type in a dynamic storage location associated with the class associated with the object when it is determined that the second type is substantially equal to the first type, the information in the dynamic storage location is arranged to be accessed for a subsequent type check without accessing the data structure containing multiple types.

29. A computer system as recited in claim 28 wherein the first mechanism is further arranged to obtain a third type when the second type is not substantially equal to the first type, the third type being a candidate type for the object, wherein the third type is obtained from the data structure containing multiple types.

30. A computer system as recited in claim 29 wherein the comparator is arranged to compare the first type against the third type, the determination mechanism is arranged to determine whether the third type is substantially equal to the first type and the dynamic storage mechanism is arranged to store information associated with the third type in the dynamic storage location when the type is substantially equal to the first type.

* * * * *

UNITED STATES PATENT AND TRADEMARK OFFICE
CERTIFICATE OF CORRECTION

PATENT NO. : 6,714,991 B1 Page 1 of 1
DATED : March 30, 2004
INVENTOR(S) : Bak et al.

It is certified that error appears in the above-identified patent and that said Letters Patent is hereby corrected as shown below:

Column 9,
Line 54, change "a fist type" to -- a first type --.

Column 10,
Line 63, change "fist type" to -- first type --.

Column 11,
Line 53, change "tat is" to -- that is --.
Line 54, change "referencing data" to -- referencing a data --.
Line 65, change "wherein including" to -- further including --.

Column 12,
Line 5, change "for determine" to -- for determining --.
Line 16, change "type it a" to -- type in a --.
Line 27, change "he second" to -- the second --.
Line 44, change "the fist type" to -- the first type --.
Line 46, change "is determine" to -- is determined --.
Line 53, change "a fist candidate" to -- a first candidate --.
Line 55, change "be dynamic" to -- the dynamic --.

Column 14,
Line 23, change "the type" to -- the third type --.

Signed and Sealed this

Second Day of August, 2005

JON W. DUDAS
*Director of the United States Patent and Trademark Office*